United States Patent [19]
Pohl

[11] 3,742,758
[45] July 3, 1973

[54] TORQUE REACTION TABLE
[76] Inventor: Eugene Pohl, 321 Leona Avenue, Huntingdon Valley, Pa. 19006
[22] Filed: Aug. 8, 1972
[21] Appl. No.: 278,786

[52] U.S. Cl. .............................. 73/134, 73/136 R
[51] Int. Cl. ............................................ G01l 3/00
[58] Field of Search ............... 73/134, 136 R, 117.4

[56] References Cited
UNITED STATES PATENTS
| | | | |
|---|---|---|---|
| 2,135,394 | 11/1938 | Geissen | 73/136 R X |
| 2,389,361 | 11/1945 | Hagg et al. | 73/134 |
| 2,845,795 | 8/1958 | Emmerling | 73/136 R |
| 3,279,244 | 10/1966 | Emmerling | 73/136 R |

FOREIGN PATENTS OR APPLICATIONS
| | | | |
|---|---|---|---|
| 1,118,645 | 3/1956 | France | 73/134 |
| 1,109,917 | 6/1961 | Germany | 72/117.4 |

*Primary Examiner*—Charles A. Ruehl
*Attorney*—Karl L. Spivak

[57] ABSTRACT

A torque reaction table for dynamic torque testing and measurement, including a pair of end positioned pedestals which affix to the transverse edges of a base and which are arranged to support a load carrying table above the base. Flexure straps of predetermined width and cross sectional dimensions connect between the respective top corners of the pedestals and the corners of the table a manner to carry the table and to maintain the supporting flexure straps in tension under all load conditions. The flexure straps angularly mount and precisely position so that the intersection of extensions of the planes at which the flexure straps are mounted align with the center of rotation of a device used to develop torque. A table mounted torque arm laterally extends from the table and is connected to a reaction sensor which is arranged for direct electrical torque readout in response to the deflection of the load carrying table.

12 Claims, 6 Drawing Figures

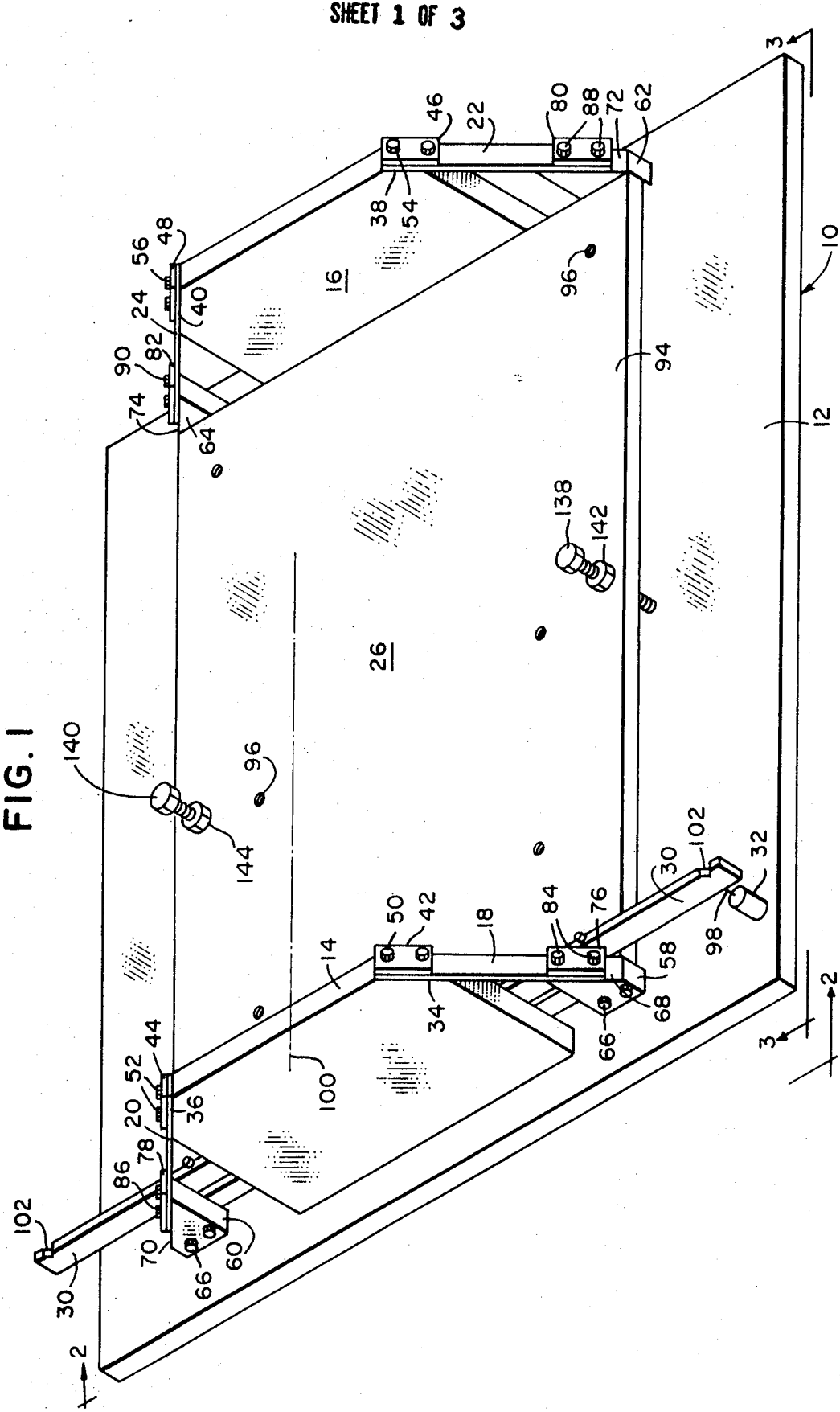

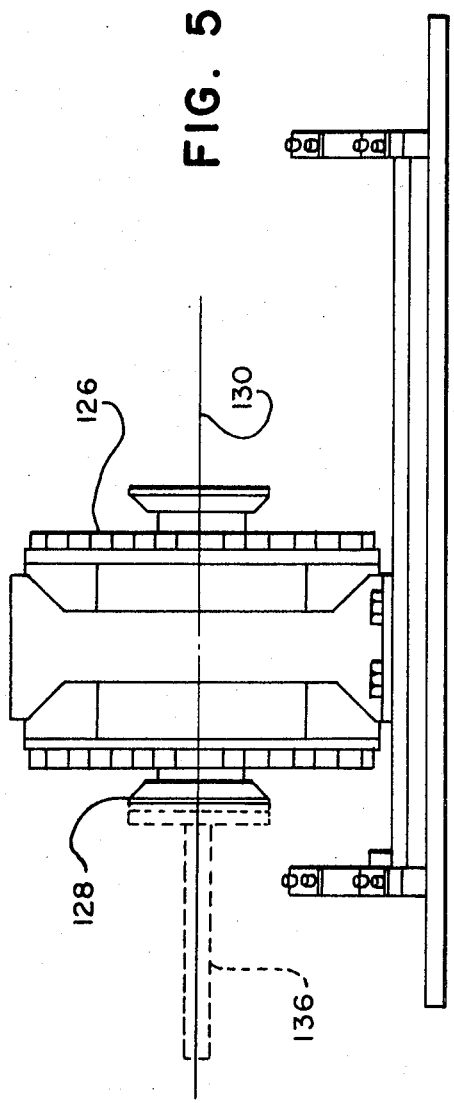
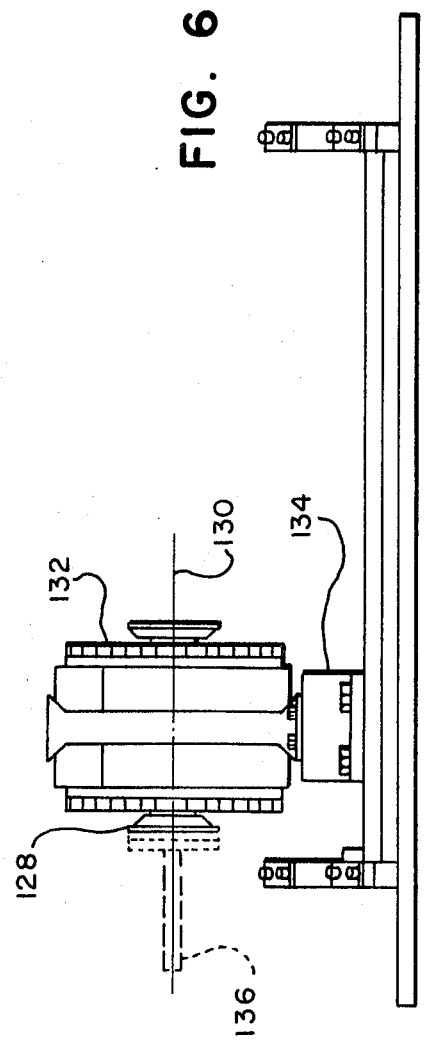

TORQUE REACTION TABLE

BACKGROUND OF THE INVENTION

The present invention relates generally to the field of dynamometers and more particularly, is directed to a torque reaction table suitable for use with either a braking device for power absorption or with a power source to drive equipment at measurable power output.

Dynamometers of various designs are well known for measuring the output of various types of power generating devices such as motors, engines, turbines and the like. Dynamometers are most often used to determine the performance of such power equipment with reliability and accuracy and also to verify that the power equipment meets predetermined output design standards. Dynamometers have been employed by prior workers in the field to serve as power absorbing machines for the accurate determination of power or torque developed by a power generating device, or to determine frictional, windage or other internal losses. Such dynamometers are frequently described as "absorption" or "motoring" mode dynamometers.

In employing prior art dynamometers in accordance with generally accepted practice, it has been necessary to mount the absorption or motoring device employed between a pair of accurately located, machined trunnion bearings and to balance the device precisely, to permit the device to produce a torque reaction which is restrained suitably to develop test measurements. In the case of large motors, generators or brakes, it will be readily appreciated that proper cradling and balancing of such heavy devices within trunnion bearings will require large and expensive bearings, pedestals and mounting bases for proper support. The present invention completely eliminates the need for the trunnion bearing type of mounting by employing a torque reaction table which is carried by relatively inexpensive and easily fabricated flexure straps which are arranged in tension.

Prior workers in the field have developed various types of dynamometers such as those which employ cantilever spring mountings, as disclosed in U.S. Pat. No. 2,845,795. The cantilever spring mountings function to permit vertical deflection of a plate and a supported member. In accordance with the teachings of this patent, the flexure members are carried in compression. When used in conjunction with larger motors, the cantilever spring mountings must be made stiffer to carry the additional weight. The increase in mass of the cantilever causes the resistance to rotation about the axis to greatly increase, thereby resulting in loss of sensitivity in the dynamometer design. U.S. Pat. No. 3,213,679 shows an arrangement for carrying a table by flexures wherein the flexures are also all employed in compression. This device also has built-in design inaccuracies in that the arrangement of flexures will not result in pure compression without bending. Further, the disposition of the mass on the table is critical in that a load which is offset from the center line of the test motor can cause unequal loading of the flexures. Since the flexures are arranged in compression, they could be more subject to unequal bending on one side as the torque reaction is developed, thereby building in a source of inaccuracy.

SUMMARY OF THE INVENTION

The present invention relates generally to torque reaction tables, and more particularly, is directed to a table which is suspended from end positioned pedestals. A plurality of angularly oriented flexure straps which are arranged in tension respectively connect the corners of the table to the corners of the pedestals to carry the table above a supporting base.

The present invention comprises a rigid table which is designed to mount a braking or motoring device and which is carried between a spaced pair of end positioned pedestals by a plurality of angularly oriented flexure straps. The geometry is such that the flexure straps permit limited measurable, angular travel, with the center of rotation being around the center line or axis of the test machine. The flexure straps are carefully machined to a predetermined width and cross section and are angularly clamped to the pedestals and to the respective corners of the table. The intersection of the angles at which the flexure straps are mounted is at the center of rotation of the braking or motoring device used for tests in the absorption or motoring modes. The brake or motoring device mounts directly upon the table and is conventionally bolted thereto. The need for cradling in expensive trunnion bearings as required in prior art dynamometers can be completely eliminated. A torque arm extends laterally from either side of the reaction table and connects to a reaction sensor which may be of the type which includes a linear variable differential transformer having core motion which results in the generation of an electrical signal. The electrical signal generated by the reaction sensor can then be interpreted by an electrical torque readout of the digital display type so that with a known length of torque arm, for example, one foot, a direct readout in pounds inches or pounds feet of torque, as required, can be developed.

The present device greatly improves over prior art dynamometers in that no expensive, sensitive trunnion bearing system is required. Further, inasmuch as there is no friction developed in a flexure strap supported table in accordance with the present disclosure, the need for lubrication can be completely eliminated.

Due to the elimination of friction, the present device will be insensitive to dirt, radiation or moisture environments. Because of this, service life should be virtually unlimited and maintenance costs can be substantilly minimized. The flexure straps are carried in tension and are angularly oriented to permit limited angular travel with rotation about the axis of rotation. This arrangement results in a simplicity of installation that is surpassed by prior art devices. The linearity of angular rotation within the limits of the design will be directly proportional to the applied torque. None of the dynamometers heretofore developed can equal the simplicity in design, low manufacturing cost or maintenance free aspects of the present device.

It is therefore an object of the present invention to provide an improved torque reaction table of the type set forth.

It is another object of the present invention to provide a torque reaction table that is carried between a pair of spaced, end positioned pedestals by a plurality of flexure straps which are arranged in tension.

It is another object of the present invention to provide a novel torque reaction table that is capable of carrying a power absorption or power developing device for torque measuring purposes without the need for cradling said braking or motoring device in trunnion bearings.

It is another object of the present invention to provide a novel torque reaction table that is carried between end positioned pedestals by two pairs of flexure straps which are carefully machined to predetermined width and cross sectional dimensions.

It is another object of the present invention to provide a novel torque reaction table designed to be supported by flexure straps which are carried in tension so that an increase in weight will tend only to increase the tensile stress in the flexures themselves without causing any change in the center line height, no matter how great is the total supported weight, within the limits of design strength of the flexures.

It is another object of the present invention to provide a novel torque reaction table that is supported by a pair of spaced end positioned pedestals and two pairs of flexure straps all of which extend from the pedestals in a manner to insure equal tensile stresses in all of the flexures.

It is another object of the present invention to provide a torque reaction table that is carried upon end positioned pedestals by two pairs of angularly arranged flexure straps, wherein planes drawn through the respective flexure straps will intersect at the axis of rotation of the device being tested.

It is another object of the present invention to provide a novel torque reaction table that is rugged in design, simple in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of a torque reaction table in accordance with the present invention.

FIG. 5 is a side elevational view similar to FIG. 3, showing an absorption device mounted thereon.

FIG. 6 is a side elevational view similar to FIG. 3, showing the mounting of a smaller absorption device by employing mounting blocks.

DESCRIPTION OF THE PREFERRED EMBODIMENT OF THE INVENTION

Figure 3:
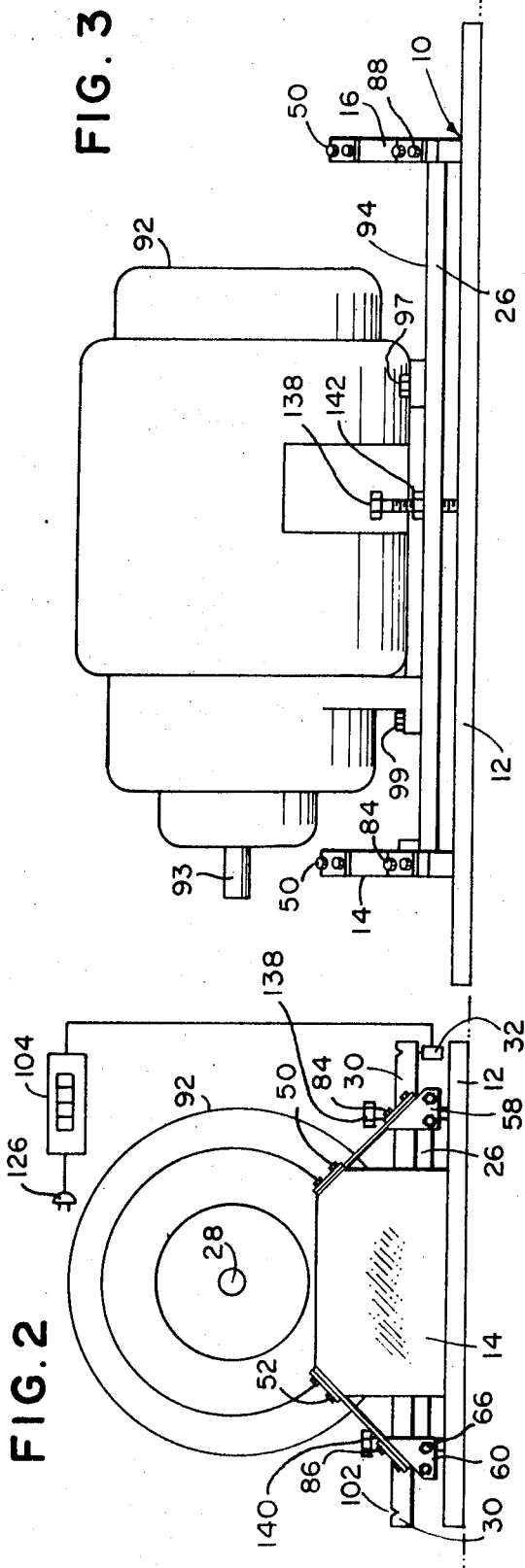
FIG. 3 is a side elevation view, in decreased scale, taken along Line 3—3 of FIG. 1, looking in the direction of the arrows and having a motor mounted thereon.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 a torque reaction table generally designated 10 which incorporates a strong, planar, steel base 12 which is fabricated of material of sufficient strength to resist deformation during test procedures, for example, ¾ inch thick steel plate. A pair of transversly spaced, solid steel pedestals 14,16 vertically extend from the top of the base 12 near the transverse edges thereof and are conventionally secured in position by suitable means, such as by machine bolts (not shown) which connect the pedestals 14,16 to the base by projecting upwardly through the bottom thereof. Pairs of right and left flexure arms 18,20 and 22,24 angularly depend from the corners of the pedestals 14,16 to carry the mounting platform 26 as hereinafter more fully set forth. It is noteworthy that the flexure arms 18,20,22,24 are all arranged in tension and tensile stresses only are imposed.

Planes drawn through the respective left and right pairs of flexure arms 18,20 and 22,24 intersect at the precise center of rotation 28 (FIG.2) of the motoring or absorbing device employed so that the flexure arms permit limited angular travel, with rotation about the center of rotation 28. A torque arm 30 affixes to the top 94 of the platform 26 and is brought out either forwardly or rearwardly as seen in FIG. 1, and connects to a reaction sensor 32 for direct torque readout in the manner hereinafter more fully set forth. Adjustable limit stops are provided to restrict the angular travel of the platform. Such limit stops may be in the form of threaded bolts 138,140 which are threadedly adjustable through the platform 26 and which may conveniently be locked in the desired position by employing conventional lock nuts 142,144.

Figure 2:
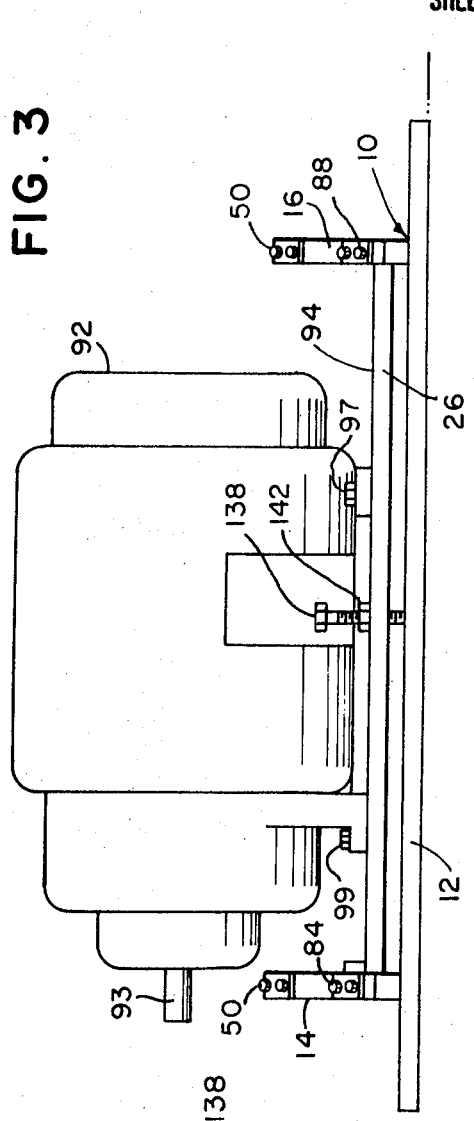
FIG. 2 is an end elevational view thereof, in decreased scale, taken along Line 2—2 of FIG. 1, looking in the direction of the arrows and having a motor mounted thereon.

As best seen in FIGS. 1 and 2, each pedestal 14,16 stationarily mounts upon the base 12 and is generally rectangularly formed of sturdy material such as ¾ of an inch thick steel plate. The upper corners 34,36 and 38,40 of the respective pedestals 14,16 are angularly cut to 45° to respectively angularly secure the upper end of one of the flexure straps 18,20,22 or 24. A plurality of mounting clamps 42,44,46,48 and a plurality of mounting bolts 50,52,54, 56 conventionally secure the respective upper ends of the flexure arms 18,20 to the upper corners of the pedestal 14 and the upper ends of the flexure arms 22,24 to the upper corners of the pedestal 16.

Corner positioned mounting brackets 58,60,62,64 respectively secure to the corners of the mounting platform 26 by means of a plurality of machine bolts 66, or similar conventional fasteners, to secure the respective mounting brackets to 58,60, 62,64 in the same vertical planes as their associated pedestals 14 and 16.

Each respective mounting bracket 58,60,62,64 has its top machined or otherwise shaped to an angle of 45° to form an inclined surface 68,70,72,74. Each said inclined surface respectively receives the bottom end of a flexure arm 18,20,22,24 in angular alignment with an angularly machined upper corner 34,36,38,40 of the respective pedestals 14,16. The lower end of each flexure arm secures to its associated mounting bracket inclined surface 68,70,72,74 by means of a clamp 76,78,80,82 which is secured in place by a pair of conventional threaded machine bolts 84,86,88,90. Thus, the entire weight of the mounting platform 26 is carried in tension by the respective flexure arms 18,20,22,24 which are stressed between the respective pedestal upper corners 34,36,38,40 and the platform connected inclined surfaces 68,70,72,74.

It will be noted that by employing the flexure arms 18,20 22,24 in tension, the weight of a motor, brake or the like 92 which is mounted upon the top 94 of the mounting platform 26 for testing purposes, will tend to increase the tensile stresses in the flexure arms without causing any significant change in the center line height between the center of rotation 28 and the top surface 94 of the mounting platform 26, even though the total supported weight may be comparatively great. I have found the use of steel flexure arms ¾ of an inch in width and 0.188 inches in thickness to be suitable for the purpose as having sufficient strength to support even large and heavy equipment without failing. By employing the flexure arms in tension, it has been found that the present flexure method requires less precisely machined elements for support purposes than those previously required by prior art type cynamometers. The tensile loading method has also proved to be much less sensitive to vibration and fatigue than previously available dynamometer devices.

In operation, an absorption or motoring device 92,126 mounts directly upon the top surface 94 of the mounting platform 26 by means of conventional fasteners such as bolts 97,99 which insert through the platform mounting holes 96 to securely affix the device being used for power absorption or power development to the platform 26. It will be noted that the center of rotation 93 of the test device 92 aligns with the center of rotation 28 which is defined by the intersection of the angles at which the pairs of flexure arms 18,20, and 22,24 are mounted. The torque arm 30 affixes to the platform 26 and is brought out either forwardly or rearwardly and is conventionally connected to a reaction sensor 32.

The reaction sensor 32 may be of the known linear varible differential transformer type whose core motion results in the generation of an electrical signal. Suitable reaction sensors for this purpose are well known and may be equipment as presently being marketed by Shaevitz Engineering Company, Gloucester County, N.J. The reaction sensor 32 connects to the torque arm mount 98 at a known distance from the longitudinal center line 100 for torque calculation purposes, for example, 24 inches. The electrical signal generated by the reaction sensor 32 is interpreted by an electrical torque readout 104 of the digital display type so that with a known length of torque arm, for example, 2-feet, a direct readout in pound-inches or pounds-feet of torque can be developed. A digital voltmeter as manufactured by Triplett Instrument Company has been found suitable for this purpose. The torque arm 30 may be provided with a known reference mark 102 of conventional design in the usual manner to which calibration weights may be attached when so desired.

In order to prove the accuracy of readings obtained with the flexures arranged in tension, the torque reaction table 10 had its torque arm 30 loaded, first with an empty table and then with a weight of 850 pounds supported upon the platform 26. Employing a torque arm of 24 inches, the following table represents the deflection in inches at various loads:

TABLE I

| SCALE-pounds | DEFLECTION-inches Empty Platform | 850 lb. on Platform |
|---|---|---|
| 0 | 0.000 | 0.000 |
| 5 | 0.003 | 0.003 |
| 10 | 0.005 | 0.005 |
| 15 | 0.0075 | 0.007 |
| 20 | 0.010 | 0.010 |
| 30 | 0.015 | 0.014 |
| 40 | 0.019 | 0.019 |
| 50 | 0.024 | 0.023 |
| 60 | 0.029 | 0.028 |
| 70 | 0.0335 | 0.033 |
| 80 | 0.038 | 0.0375 |
| 90 | 0.043 | 0.042 |
| 100 | 0.0475 | 0.046 |

Referring now to FIG. 5, I show a torque reaction table 10 used in conjunction with an absorber 126 which is bolted to the platform 26 in the usual manner and includes a flange 128 for conventional coupling to a test device (not shown). In the manner hereinbefore illustrated, it will be noted that the center of rotation 130 of the absorber 126 aligns with the intersection of planes drawn through the pairs of flexure arms 18,20, and 22,24. In FIG. 6, I show a smaller absorber 132 which is mounted upon the platform 26. A plurality of spacer blocks 134 are employed to elevate the absorber 132 sufficiently from the platform surface 94 to align its center of rotation with the intersection of the plane extensions of the flexure arms 18,20 and 22,24. A connecting shaft 136 is illustrated in phantom lines for purposes of association.

Figure 4:
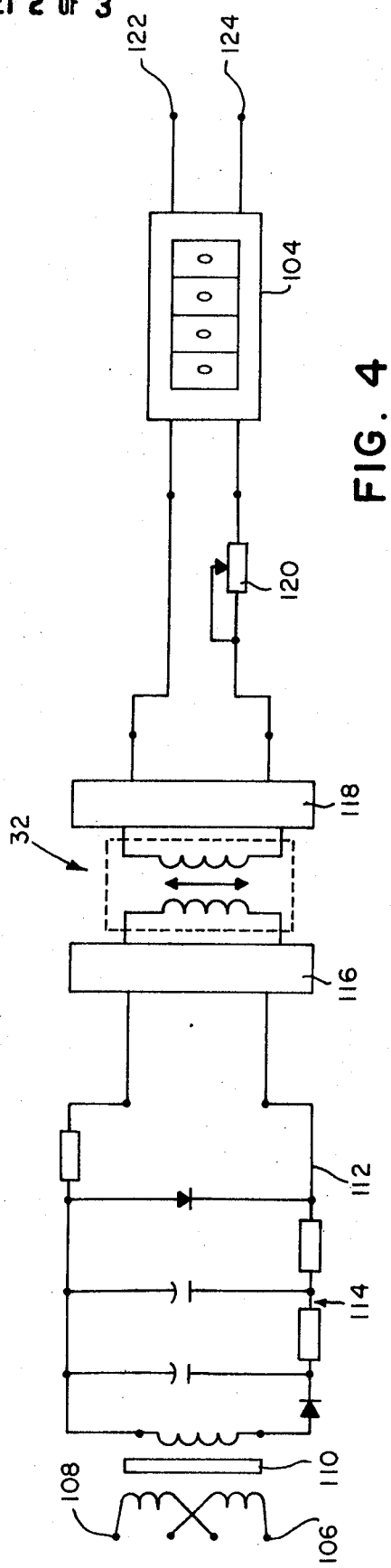
FIG. 4 is a schematic electrical wiring diagram of the torque readout system.

Referring now to FIG. 4, I show a schematic wiring diagram of the torque readout system wherein conventional 115 volt 60 cycle current is connected to the terminals 106,108 of a step down transformer 110. The transformer output is directed through a signal conditioning network 112 which includes a direct current power supply section 112 and an oscillator 116 which functions to change the system frequency. The oscillator output is directed to the reaction sensor 32 wherein linear motion of the arm 30 results in the generation of an electrical signal. The generated electrical signal passes through the demodulation and filter system 118 to the digital torque readout 104 through the variable resistor calibration device 120. A conventional plug 126 supplies 115 volt current to the terminals 122,124 of the torque readout 104 from a convenient source of electrical power, such as a wall receptacle (not shown).

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a torque reaction table for dynamic torque testing and measurement and suitable for mounting a braking or motoring device having an axis of rotation, the combination of
  A. a strong, planar base,
    1. said base being constructed of materials having sufficient strength to resist deformation and having a first transverse edge and a second transverse edge;
  B. a pedestal affixed to the base near each transverse edge thereof,
    1. said pedestals being vertically arranged and being fabricated of material strong enough to resist deformation when in use,
    2. said pedestals being fabricated to include a pair of spaced, upper corners, 3. said pedestals being provided with angular flexure carrying means for supporting load carrying flexures;
C. a plurality of flexure arms angularly depending from the said flexure carrying means,
  1. said flexure arms carrying the machine load in tension,
  2. said flexure arms having an upper end and a lower end,
  3. said flexure arms being angularly disposed with respect to the plane of the said base;
D. a braking or motoring device mounting platform supported from the said pedestals in a manner to permit some angular travel with respect to the pedestals,
  1. said platform being carried by portions of the said flexure arms,
  2. said platform being supported in spaced relationship above the said base; and
E. torque measuring means associated with the platform to give indication of the deflection of the platform.

2. The invention of claim 1 wherein the flexure carrying means position at the said upper corners of the pedestals.

3. The invention of claim 2 wherein the upper corners are angularly cut to provide an angular surface and wherein the upper end of each flexure arm affixes to an angular surface to maintain the flexure arm in alignment with the angular surface.

4. The invention of claim 3 and a plurality of mounting brackets affixed to the machine mounting platform, each mounting bracket having an inclined surface, each inclined surface being so positioned and so angularly inclined as to fall in a plane extending through a corresponding angular surface of the pedestals.

5. The invention of claim 4 wherein the lower end of each flexure arm is affixed to an inclined surface of a mounting bracket.

6. The invention of claim 5 wherein extensions of planes drawn through the angular surfaces of each pedestal intersect at the axis of rotation of the machine.

7. The invention of claim 6 wherein the torque measuring means include a torque arm affixed to the platform and extending outwardly therefrom and a reaction sensor.

8. The invention of claim 7 wherein the reaction sensor includes a linear variable differential transformer, said transformer having a core which is connected to the torque arm and which is movable upon movement of the torque arm and wherein the movement of the core results in the generation of an electrical signal.

9. The invention of claim 8 wherein the said electrical signal is fed to an electrical torque readout device.

10. The invention of claim 9 wherein the electrical torque readout device includes digital display means wherein a direct, visible torque readout is produced.

11. The invention of claim 6 and adjustable means associated with the mounting platform to limit the angular travel of the platform.

12. The invention of claim 11 wherein the adjustable means include a threaded bolt which is threadedly adjustable through the platform and which is positioned to stop against the base, to thereby adjustably limit the angular travel of the platform.

* * * * *